United States Patent
Rocheblave et al.

(10) Patent No.: US 8,827,358 B2
(45) Date of Patent: Sep. 9, 2014

(54) LINING FOR A VEHICLE BONNET

(75) Inventors: Laurent Rocheblave, Villeurbanne (FR);
Laurent Martin, Peaugres (FR);
Hugues Cheron, Meximieux (FR)

(73) Assignee: Compagnie Plastic Omnium, Lyon (FR)

( * ) Notice: Subject to any disclaimer, the term of this patent is extended or adjusted under 35 U.S.C. 154(b) by 193 days.

(21) Appl. No.: 13/126,036

(22) PCT Filed: Oct. 26, 2009

(86) PCT No.: PCT/FR2009/052055
§ 371 (c)(1),
(2), (4) Date: Jul. 11, 2011

(87) PCT Pub. No.: WO2010/049632
PCT Pub. Date: May 6, 2010

(65) Prior Publication Data
US 2012/0126581 A1    May 24, 2012

(30) Foreign Application Priority Data

Oct. 27, 2008    (FR) ...................................... 08 57290

(51) Int. Cl.
*B62D 25/10*    (2006.01)
*B62D 25/12*    (2006.01)

(52) U.S. Cl.
CPC .............. *B62D 25/105* (2013.01); *B62D 25/12* (2013.01)
USPC ..................... 296/193.11; 180/69.2

(58) Field of Classification Search
USPC ..................... 296/193.11; 180/69.2
See application file for complete search history.

(56) References Cited

U.S. PATENT DOCUMENTS

| | | | |
|---|---|---|---|
| 5,000,997 A | 3/1991 | Ritchie et al. | |
| 5,535,841 A * | 7/1996 | Cobes et al. | 180/69.2 |
| 5,538,094 A | 7/1996 | Cobes, Jr. et al. | |
| 7,140,673 B2 * | 11/2006 | Ito et al. | 296/193.11 |
| 7,296,845 B2 * | 11/2007 | Seksaria et al. | 296/146.6 |
| 7,810,877 B2 * | 10/2010 | Ishitobi | 296/193.11 |
| 8,118,352 B2 | 2/2012 | Rocheblave et al. | |
| 2006/0158007 A1 | 7/2006 | Seksaria et al. | |
| 2009/0195031 A1 | 8/2009 | Ishitobi | |
| 2010/0045070 A1 | 2/2010 | Rocheblave et al. | |

FOREIGN PATENT DOCUMENTS

| | | |
|---|---|---|
| DE | 102005030103 A1 | 1/2006 |
| EP | 382013 A1 | 8/1990 |
| FR | 2915168 A1 | 10/2008 |
| JP | 11198858 | 7/1999 |
| JP | 11198858 A | 7/1999 |
| JP | 2006008042 | 1/2006 |
| JP | 2007245853 | 9/2007 |
| JP | 2008007064 | 1/2008 |
| JP | 2008007064 A | 1/2008 |
| WO | 2008062143 | 5/2008 |

* cited by examiner

*Primary Examiner* — Glenn Dayoan
*Assistant Examiner* — Melissa A Black
(74) *Attorney, Agent, or Firm* — Jacox, Meckstroth & Jenkins

(57) ABSTRACT

A vehicle hood lining presenting at least one depression that is preferably elongate along an edge of the lining, the depression presenting, at a distance from its ends, at least one singularity that is not reproduced both identically and continuously all along the length of the depression.

20 Claims, 2 Drawing Sheets

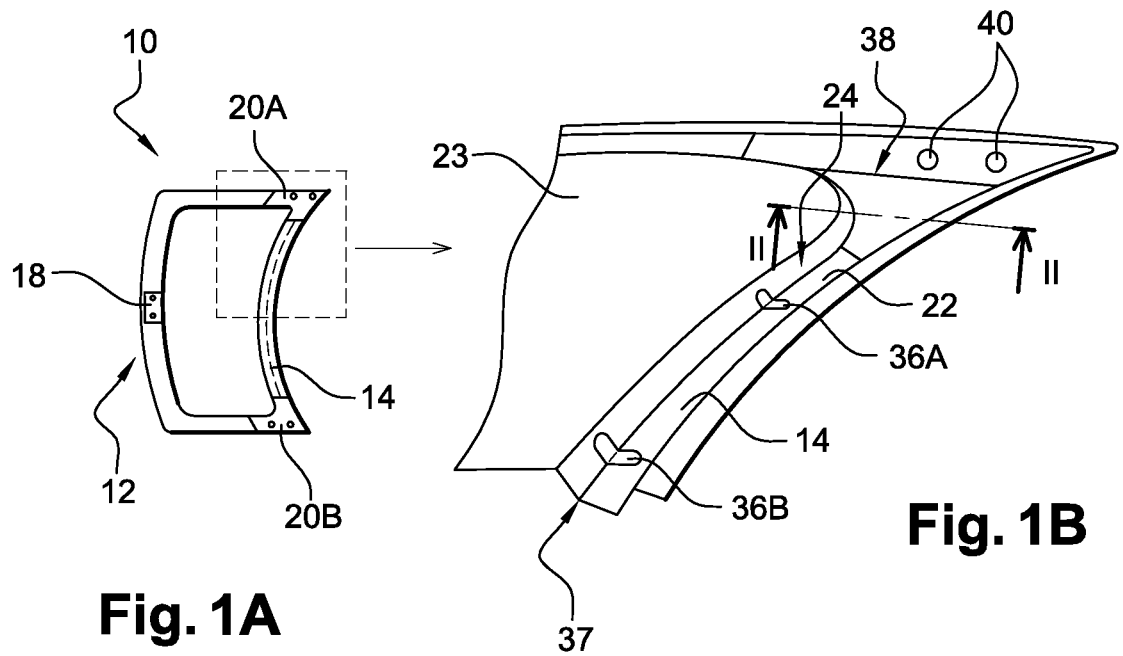
Fig. 1A
Fig. 1B
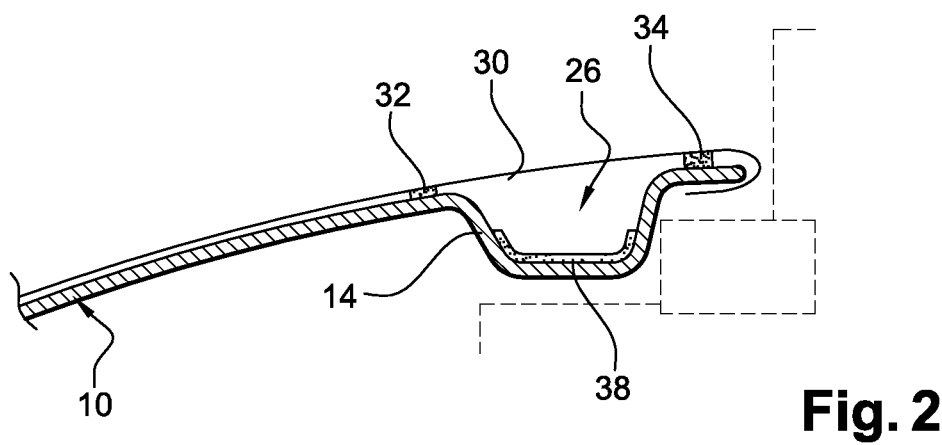
Fig. 2
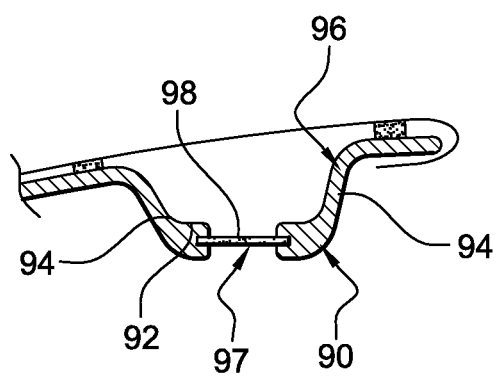
Fig. 6

LINING FOR A VEHICLE BONNET

CROSS-REFERENCE TO RELATED APPLICATIONS

This application is the U.S. National Phase application of PCT/FR2009/052055 filed Oct. 26, 2009, which claims priority to French Application No. 0857290 filed Oct. 27, 2008, which applications are incorporated herein by reference and made a part hereof.

BACKGROUND OF THE INVENTION

1. Field of the Invention

The present invention relates to a vehicle hood.

2. Description of the Related Art

A vehicle hood is already known that comprises a skin and a lining that are superposed. The skin is essentially plane and the lining includes a depression extending essentially in the transverse direction of the vehicle when the hood is mounted on the vehicle, the depression being located at the rear end of the hood and being shaped to co-operate with the skin of the hood to form at least one hollow body.

The lining is made of a thermosetting material such as sheet molding compound (SMC), while the skin is made of metal, such as aluminum.

The skin and the lining of the hood are connected together at their respective ends by adhesive and by crimping, and they are subsequently mounted on the vehicle.

Nevertheless, because of the intrinsic properties of the two types of material making them up, the skin and the lining behave very differently with respect to temperature. Thus, the hood tends to deform when the temperature increases as a result of differential expansion between the skin and the lining that together make up the hood. This is particularly troublesome when the bodywork passes through cataphoresis, during which the bodywork and the hood mounted thereon are immersed in a bath and then pass through a stove at very high temperature. While in the stove, the skin expands more than the lining, which is attached to the skin at each of its ends, thereby giving rise to deformation of the hood. In addition, if provision is made for adhesive to be cured while the hood is passing through the stove, the skin and the hood are held stationary relative to each other in a deformed configuration of the hood, and that is unsatisfactory since it is no longer possible to return the hood to its normal shape on cooling.

The problem of remanent deformation associated with differential expansion is analogous when the skin and the lining are made of other materials. In particular, the problem also exists for a skin made of steel and a lining made of thermoplastic material, except that under such circumstances, it is the lining that expands more than the skin.

What is needed, therefore, is a system, method and lining that overcomes one or more of the problems mentioned.

SUMMARY OF THE INVENTION

An object of the invention is to remedy those drawbacks by providing a lining that makes it possible to limit, or even avoid, deformation of the hood after passing to a high temperature and cooling.

To this end, one embodiment of the invention provides a vehicle hood lining presenting at least one elongate depression, preferably along an edge of the lining, the depression presenting, at a distance from its ends, at least one singularity that is not reproduced both identically and continuously all along the length of the depression.

Naturally, the at least one singularity is present in the initial state of the lining, and a hood lining that has been subjected to an impact and that presents a singularity solely as a result of that impact does not constitute a lining of the invention.

Such a singularity modifies the section of the depression locally. An orifice or a portion in relief may form such a singularity. In contrast, an edge or a reentrant corner in the depression, located at the intersection between two walls of the depression, is a singularity, but one that is reproduced identically and continuously over the entire length of the depression.

Since the depression is the most rigid portion of the lining, it is the depression that guides deformation of the lining.

Thus, by providing at least one singularity in the depression, e.g., an orifice, the wall(s) of the depression are not solid and continuous, as happens in the prior art, thereby facilitating deformation of the lining.

The hood lining thus follows expansion of the skin more easily and the deformation induced in the hood by differential expansion is thus diminished.

As a result, when the skin and the lining are connected together by adhesive, and if the adhesive is cured while the hood is passing through the cataphoresis stove, the relative positioning of the skin and the lining while they are being held stationary relative to each other remains satisfactory, since the deformation of the hood is less.

The invention also makes it possible to achieve this result when it is the lining that deforms more than the skin.

In addition, since the deformation of the hood is less, if the skin and the lining are already held stationary relative to each other because the adhesive that bonds them together is already cured, then when they pass through the cataphoresis stove the stresses to which the lining is subjected are smaller and the behavior of the hood over time is improved.

When the skin and the lining are connected together by adhesive, the invention also makes it possible to reduce the shear stresses that appear in the adhesive or at the interface between the adhesive and the skin or the lining as a result of the hood deforming as it passes through cataphoresis, thereby improving the fastening of the skin relative to the lining.

The invention also presents one or more of the characteristics in the following list:

The lining is dimensioned to be superposed over the skin over substantially the entire area of the skin. In particular, the lining has a plurality of elongate depressions extending in distinct longitudinal directions.

The depression includes at least two and preferably at least three singularities, thereby optimizing the influence of these singularities on the behavior of the hood in the event of it expanding.

The singularity is a shape singularity, the depression preferably being shaped in such a manner that, if an envelope surface is defined along the depression and having a reference cross-section that is constant, then the portion of the depression that is superposed on the envelope presents at least one interruption or orifice.

At least one wall of the depression presents at least one orifice. Because of the empty space that it forms in the wall, such an orifice facilitates deformation of the lining and reduces the stresses to which it is subjected. The orifice is particularly advantageous for absorbing compression expansion of the lining. When the lining passes through cataphoresis, its strength is degraded because of the high temperature and the lining tends to sag under the effect of its own weight. This effect opposes the thermal expansion of the hood and certain portions of the lining are subjected to compression as a result of this phenomenon. The presence of orifices thus makes it possible to allow greater deformation of the lining, more particularly in compression, and to reduce the stresses generated therein as a result of it sagging. These orifices also serve to position and hold cables relative to the lining.

In particular, the depression comprises at least two walls and a line of intersection between these two walls, with the orifice interrupting the line. This is particularly advantageous since the stresses due to the deformation of the hood are particularly concentrated at the edges and the reentrant corners of the depression. Such an orifice "breaks" the shapes of those elements and allows the lining to deform more easily and enables the stresses to which it is subjected to be reduced.

At least one wall of the depression includes at least one projecting or recessed portion in relief. In particular, the portion in relief includes at least one edge or reentrant corner and is preferably in the shape of a crenellation. The presence of an edge or of a reentrant corner that projects or is recessed relative to the main wall of the depression enables the lining to fold and unfold at the edge or the reentrant corner. This therefore facilitates deformation of the depression and consequently of the lining, thereby reducing the stresses generated therein as a result of the differential expansion. Furthermore, with such portions in relief, the stiffening properties of the hollow body formed using the depression are better than when the singularity is in the form of an orifice.

The depression includes at least two walls with a line of intersection between those two walls, the portion in relief being contiguous with the line. Such a conformation for the lining enables stresses to be reduced at the edges or reentrant corners of the depression, a zone in which stresses are particularly concentrated.

The depression presents a first thickness in a zone contiguous with the portion in relief, while the portion in relief presents a second thickness that is smaller than the first thickness. By reducing the thickness of the portion in relief, deformation of the lining is made still easier.

The singularity is a material singularity. In particular, the depression presents a first portion made of a first material and defining at least one orifice, and a second portion made of a second material different from the first material and arranged in at least one of the orifices, preferably by being embedded in the first material by overmolding. The second portion is preferably made out of the same material as the skin of the hood. A lining presenting a material singularity, in particular when one of the two materials is a metal or a glass fiber reinforced plastics material, presents very good rigidity, thereby increasing the strength of the lining so as to reduce its sagging under the effect of its own weight while passing through cataphoresis. In addition, when the shape and the material of the second portion are suitably selected, they serve to assist the depression in expanding as much as the hood. For example, for a hood made of an aluminum hood and a lining presenting a first portion made of plastics material, e.g., of SMC, and a second portion made of aluminum, the second portion of the depression tends to expand more than the first portion and to allow the lining to expand in a manner that is closer to the manner in which the skin expands so as to avoid deforming the hood. It is also possible for the second portion to present a stamped shape or to be superposed on the first portion of the depression.

Projecting from a wall of the depression, the lining includes a rib that preferably extends essentially vertically downwards when the lining is mounted on the vehicle, the rib carrying in particular a sealing gasket at a free end. The rib thus also serves to prevent, or at least to limit, any sagging of the lining as a result of its own weight, since it bears against parts that form part of the vehicle bodywork, thereby enabling the hood to be held in position. The sealing gasket also serves to provide sealing in the scuttle zone of the hood, when the depression is situated in the rear portion of the hood and extends in the transverse direction thereof, thereby establishing hermetic separation between the vehicle cabin and the vehicle engine compartment.

The first material is a plastics material, in particular a thermosetting material such as sheet molding compound (SMC), whereas the second material is a metal material, such as aluminum or steel.

The first material is a plastics material, selected in particular from a thermoplastic material based on polypropylene or on polyamide and optionally reinforced with glass fibers, while the second material is selected from a metal material such as aluminum or steel, a plastics material distinct from the first material, and a metal-plastics composite material and/or including carbon or magnesium.

The depression extends essentially along the transverse direction of the hood, preferably along its rear edge.

The invention also provides a vehicle hood comprising:
a lining in accordance with the invention; and
a skin made from a metal material such as steel, aluminum, or a metal/plastics hybrid material.

In addition, the lining and the skin of the hood of the invention may be connected together at each of the ends of the depression.

Optionally, the second material of the lining is the same as the material constituting the skin.

The invention also provides a method of fabricating a vehicle lining, wherein the lining is fabricated in such a manner as to present at least one elongate depression, preferably along an edge of the lining, and that the depression presents, at a distance from its ends, at least one singularity that is not reproduced both identically and in continuous manner along the entire length of the depression. Such a method enables the lining of the invention to be fabricated.

Optionally, with a lining that is designed to be molded using a first material, an element made of a second material is placed in a mold for fabricating the lining, in particular an element made of a metal material, such that the element forms a portion of the depression, once the lining has been molded. By overmolding an element made of a different material in this way, the different material preferably being the same as the material of the skin, it is possible to influence the expansion of the lining and to reduce the differential expansion of the hood and its deformation at high temperatures.

Advantageously, the second material is different from the material of the skin, but is selected in such a manner that the overall behavior of the lining in expansion is very similar to that of the skin.

These and other objects and advantages of the invention will be apparent from the following description, the accompanying drawings and the appended claims.

BRIEF DESCRIPTION OF THE ACCOMPANYING DRAWINGS

The invention can be better understood on reading the following description given purely by way of example and made with reference to the drawings, in which:

FIG. 1A is a schematic plan view of a lining in an embodiment of the invention;

FIG. 1B is a perspective view of a portion of the FIG. 1A lining;

FIG. 2 is a section view on plane II-II of the FIG. 1B lining, when assembled with the skin;

FIG. 6 is a view of a hood including a lining in a fifth embodiment of the invention.

DETAILED DESCRIPTION OF THE PREFERRED EMBODIMENTS

Figure 3:
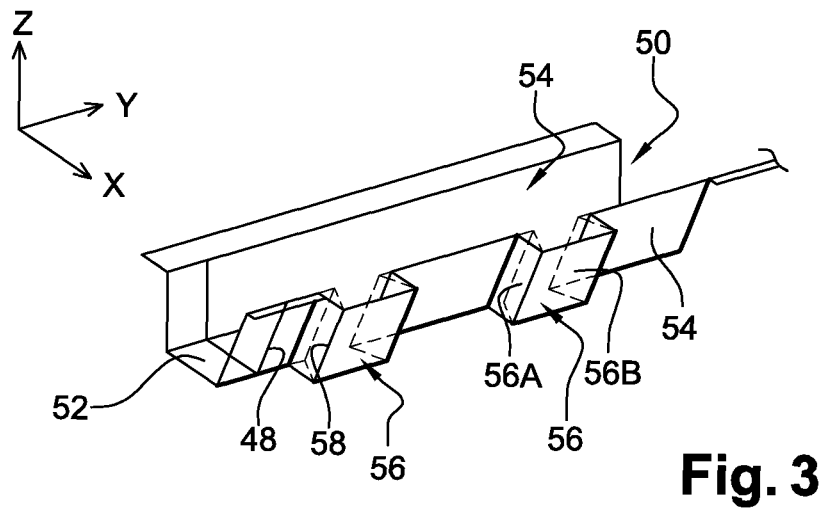
FIG. 3 is a perspective view of a detail of a lining in a second embodiment of the invention.

FIG. 1A is a diagrammatic view of a hood lining 10 that is to extend essentially over the entire area of the hood and thus line the skin over essentially all of its area. The hood lining 10 includes a peripheral depression 12 that includes in particular an elongate rear portion 14 extending essentially in the transverse direction of the hood in the vicinity of the rear of the hood, in particular along its rear edge. This depression 12, in particular the portion 14, contributes a large fraction of the stiffnesses of the hood.

As can also be seen in FIG. 1A, the hood lining 10 includes locations 18, 20A, and 20B that constitute points for attaching the hood to the bodywork. The location 18 is situated in the front portion of the depression 12, in the center of the front edge of the hood lining 10, and serves to receive a lock, and the locations 20A and 20B, each situated in one of the rear corners of the hood lining 10, in the portion 14, serve to receive the hinges.

As can be seen more particularly in FIG. 1B, showing a detail of a rear corner of the hood lining 10, the portion 14 of the depression 12 presents a U-shaped cross-section with its concave side being designed to face towards the hood skin 30 of the hood when the hood skin 30 and the hood lining 10 are assembled together.

The portion 14 comprises in particular a bottom wall 22 that is essentially parallel to a central portion 23 of the lining 10 and two side walls 24 that connect the bottom 22 to the remainder of the hood lining 10.

As can be seen in FIG. 2, when the hood lining 10 and a hood skin 30 are assembled together, the portion 14 co-operates with the hood skin 30 to form a hollow body 26, together defining a cavity. In addition, the hood skin 30 and the hood lining 10 are assembled to each other on either side of the depression 12 using a plastics filler 32 along a longitudinal edge 10a of the hood lining 10 beside the depression 12 adjacent to the central zone of the hood lining 10, or an adhesive 34 that is curable using moisture, possibly when hot, along the other longitudinal edge of the hood lining 10, adjacent to the edge of the hood. In addition, at the end of the hood lining 10 beside the depression 12, the hood skin 30 and the hood lining 10 are crimped together, i.e., the hood skin 30 is folded over so as to be clamped around the hood lining 10. At the ends of the depression 12 along its longitudinal direction, the hood skin 30 and the hood lining 10 are also secured to each other, in particular using an adhesive and crimping. The hood skin 30 is made of a metal material, such as steel or aluminum.

The depression 12 also includes two orifices 36A, 36B (FIG. 1B) that form shape singularities. These orifices 36A, 36B are formed both through the bottom wall 22 and through one of the side walls 24 of the depression 12, in this example the wall closer to the central zone of the hood lining 10. Thus, each of the orifices 36A, 36B interrupts a line 37 forming a reentrant corner marking the join between the bottom wall 22 and the side wall 24.

As can be seen in FIG. 2, the hood lining 10 also has reinforcement 38 at the ends of the portion 14 along its longitudinal direction and in the rear corners of the hood lining 10, the reinforcement 38 comprising fastener orifices 40 (visible in FIG. 1B) enabling the hinges to be fitted to the hood lining 10 by means of fastener screws.

As can be seen in FIG. 2, this reinforcement 38 is stamped to present a U-shaped section so as to be superposed on the portion 14 at its end in its longitudinal direction.

The lining, and in particular the portion 14, is made of a plastics material, in particular a thermosetting material such as sheet molding compound (SMC), while the reinforcement 38 is made of a metal material such as aluminum or steel, the material preferably being the same as the material constituting the hood skin 30.

Thus, when the hood made up of the hood lining 10 and the hood skin 30 is subjected to cataphoresis, in particular in a stove for drying the bodywork after a cataphoretic bath, the hood is raised to a high temperature and the hood skin 30 and the hood lining 10 expand. Nevertheless, since the hood skin 30 and the hood lining 10 are not made of the same material, differential expansion occurs between those two elements. When the hood skin 30 is made of aluminum, it expands much more than does the hood lining 10 since the hood lining 10 is made of SMC.

As a result of the orifices 36A, 36B formed in the depression 12, it is easier for the hood lining 10 to deform. The hood lining 10 can then follow the deformation of the hood skin 30 more easily.

In addition, because of the presence of the reinforcement 38 inside the portion 14, the reinforcement 38 being made of a metal material and thus tending to expand more than the hood lining 10, in particular if it is made of aluminum, the expansion of the depression 12 is closer to that of the hood skin 30 such that the hood lining 10 follows the hood skin 30 more easily.

FIG. 3 shows a depression 50 of a motor vehicle hood lining 10 in a second embodiment of the invention.

Like the depression 12 in the first embodiment, the depression 50 extends substantially in the transverse direction of the hood. It presents a cross-section that is U-shaped and comprises in particular a bottom wall 52 and two side walls 54.

An envelope surface having a U-shaped cross-section given reference 48 as shown in FIG. 3 is defined from the hollow body and it follows a director line of the depression 50, where one such director line is drawn as a dashed line in FIG. 1A.

On one of its side walls 54, the depression 50 includes two portions in relief 56 that are hollow when seen from the inside of the depression 50. Thus, the portion of the depression 50 that is superposed on the envelope surface 48 has two orifices corresponding to the locations at which the portions in relief 56 are formed on the depression 50.

Each of these two portions in relief 56 presents a cross-section in the X-Y plane that is U-shaped and forms a shape singularity in the depression 50. The longitudinal direction of these portions in relief 56 extends essentially perpendicularly to the longitudinal direction of the depression 50, and corresponds in particular to a vertical direction when the hood lining 10 is assembled in the closed position on the vehicle. Each portion in relief 56 comprises in particular a plane end wall 56B and two likewise plane side walls 56A, and it presents edges 58 that extend essentially in the vertical direction.

Thus, the side wall 54 of the depression 50 is in the form of a crenellation. Such a shape facilitates deformation of the depression 50 since the portions in relief 56 can fold and/or unfold at their edges 58. In addition, the stiffness of the hood is not significantly reduced.

Figure 4:
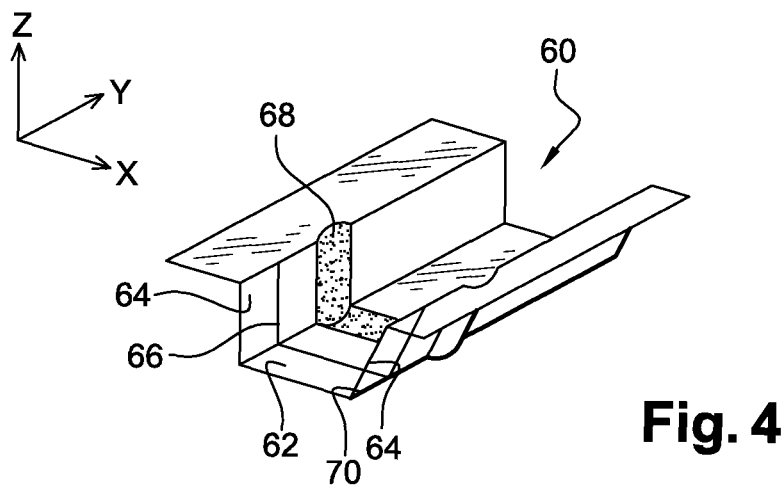
FIG. 4 is a perspective view of a detail of a lining in a third embodiment of the invention.

A lining in a third embodiment of the invention is described below with reference to FIG. 4.

The depression 60 in the hood lining 10 is of a shape similar to that of the first and second embodiments, i.e., it is essentially elongate in shape and presents a U-shaped cross-section. It also includes a bottom wall 62 and two side walls 64. As above, a U-shaped reference section 66 is defined from the depression 60 and extends along the director line of the depression 60.

This depression 60 also has a hollow portion in relief 68 forming a shape singularity in the depression 60. This portion in relief 68 is formed over the entire cross-section from one side wall to the other, i.e., over the entire transverse dimension of the bottom wall 62 and also of the side walls 64 of the depression 60.

This portion in relief 68 is in the form of a groove or trough extending perpendicularly to the longitudinal direction of the depression 60 and presenting a cross-section in the Y-Z plane in the bottom wall 62 and in the X-Y plane in the side walls 64, forming portions of a circle. It is shaped in such a manner that the portion of the depression 60 that is superposed on the envelope surface is interrupted in its portion including the portion in relief 68.

This portion in relief 68 is contiguous with the reentrant corners or lines 70 of the depression 60 marking the joins between the bottom wall 62 and the side walls 64 and it intersects them, such that these lines 70 are not rectilinear.

Figure 5:
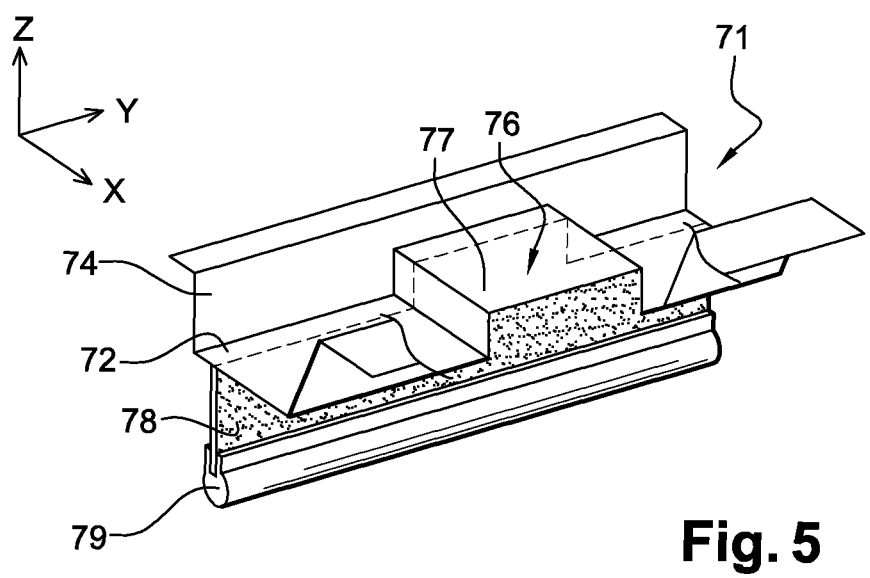
FIG. 5 is a perspective view of a detail of a lining in a fourth embodiment of the invention.

FIG. 5 shows a depression 71 of a hood lining 10 in a fourth embodiment of the invention. Such a depression 71 is of generally elongate shape and it presents a U-shaped cross-section. It has a bottom wall 72 and two side walls 74. It also has a portion in relief 76 projecting from the bottom wall 72 and forming a singularity in the form of a hollow body. This portion in relief 76, as in the second embodiment, forms a crenellation. It extends into the depression 71 such that a wall 77 of the portion in relief 76, extending essentially parallel to the bottom 72 of the depression 71, thus comes closer to the hood skin 30 when the hood lining 10 and the hood skin 30 are assembled together than does the bottom wall 72 of the depression 71.

The hood lining 10 also includes a rib 78 projecting from the bottom wall 72 of the depression 71, the rib 78 being essentially perpendicular to the bottom wall 72, parallel to its longitudinal direction, and extending vertically downwards when the hood is assembled on the vehicle. At its free end, this rib 78 includes a sealing gasket 79 for resting on at least one element of the engine compartment when the hood is arranged on the vehicle. This sealing gasket 79 serves to isolate the hood from the vehicle cabin when the depression 71 is located on the hood in the same manner as the portion 14 on the hood of FIG. 1. In addition, since the rib 78 bears against parts inside the engine compartment, it serves to limit the extent to which the hollow body sags under the effect of its own weight, which phenomenon occurs when the hood is raised to a high temperature, e.g., during cataphoresis.

Another embodiment of the invention is described below with reference to FIG. 6.

In this embodiment, the hood lining 10 includes a depression 90 of shape similar to that of the other depression, i.e., it extends substantially in a main direction and presents a U-shaped cross-section. It has a bottom wall 92 and two side walls 94.

This depression 90 includes a first portion 96 made of plastics material, e.g., of SMC, and presents an orifice 97 formed in the bottom wall 92 thereof.

As can be seen in FIG. 6, the hood lining 10 presents a material singularity. The orifice 97 formed in the plastics material is filled with a second portion 98 that is made of a metal material and that is arranged in the hood lining 10 to fill the orifice 97 formed in the plastics material portion of the depression 90. In particular, as can be seen in FIG. 6, this second portion 98 is constituted by a metal plate, the metal plate being embedded in the hood lining 10 during molding such that its position relative to the remainder of the hood lining 10 is accurately determined. A plurality of singularities of this type may be provided in the depression 90. In this manner, each metal plate placed in an orifice of a plastics portion of the depression 90 may be made of a material that enables it to expand to a greater or lesser extent than the plastics portion of the depression 90 and at a selected ratio, such that the hood lining 10 follows the expansion of the hood skin 30 during the stoving operation of cataphoresis, during which the hood is raised to a high temperature. The metal plate formed in each of the orifices are thus preferably made of the same material as the hood skin 30 or of a material that expands to a greater extent.

The invention is not limited to the embodiment described above.

The hood skin 30 and the hood lining 10 may be made of materials other than those described. For example, the hood lining 10 may be made of a thermoplastic material placed on polyamide or on polypropylene, possibly reinforced by glass fibers. The hood skin 30 may be of a metal material other than those described, or indeed it may be made of a plastics material. The hood lining 10 and/or the hood skin 30 may also be made using a hybrid material comprising both a plastics material and a metal material, and possibly carbon or magnesium.

The hood skin 30 may also be made of a thermoplastic material and the hood lining 10 may be made of a metal material, the hood skin 30 then expanding less than the hood lining 10. Under such circumstances, the hood lining 10 may include a material singularity, the second portion of the material being made of a material that expands less than the hood skin 30.

In addition, the shapes of the depressions are not limited to those described, nor indeed are they limited in their locations relative to the hood. For example, the depressions may be of V-shaped section, and/or they may extend essentially in the longitudinal direction of the hood.

Furthermore, the shapes of the portions in relief, their locations, or their distributions are not limited to those described. By way of example, they may be of V-shaped section or they may be of concertina shape. The shape of the orifices are not limited to the shapes described. They may be formed in one wall only, for example.

Similarly, when the singularity is a material singularity, the metal portion may be formed both on a portion of the bottom 92 of the depression and a portion of at least one of the side walls 94 of the depression, e.g., being of a shape that is complementary to the orifice 36A, 36B shown in FIG. 1B. The metal portion is then obtained by stamping or folding and is formed in the mold for making the plastics lining.

In addition, the numbers of portions in relief or orifices is not limited to those described above. In particular, it is advantageous for the depression to present at least three singularities in order to facilitate deformation of the hood lining 10. These elements may also be present in combination in the hood lining 10.

When the depression presents at least one portion in relief, it may also present a first thickness in the portion that is superposed on the envelope surface, contiguous with the portion in relief, and a smaller second thickness in the portion forming the relief, in particular at its edges, thereby further facilitating deformation of the lining.

It should also be observed that the metal reinforcement(s) present in the lining may be of any shape other than those described or may be located in positions other than those described. By way of example, a single piece of metal reinforcement may extend over the entire length of the depression 14, etc.

While the system, apparatus and method herein described constitute preferred embodiments of this invention, it is to be understood that the invention is not limited to this precise system, apparatus and method, and that changes may be made therein without departing from the scope of the invention which is defined in the appended claims.

What is claimed is:

1. A vehicle hood lining comprising:
   at least one elongate depression, preferably along an edge of the vehicle hood lining, said at least one elongate depression having at least one singularity that is not reproduced both identically and continuously all along a length of said at least one elongate depression;
   wherein said at least one singularity is a material singularity, said at least one elongate depression comprising at least a first portion made of a first material and defining at least one orifice, and a second portion made of a second material different from said first material and arranged in said at least one orifice so that said at least one orifice is filled with said second portion, said at least one elongate depression comprises a bottom wall having said at least one orifice with said second material arranged in said at least one orifice at least a portion of said second material engaging said bottom wall.

2. The vehicle hood lining according to claim 1, wherein said at least one singularity is a shape singularity, said at least one elongate depression being shaped in such a manner that if an envelope surface is defined along said at least one elongate depression and having a reference cross-section that is constant, then a portion of said at least one elongate depression that is superimposed on said envelope surface provides at least one interruption or orifice.

3. The vehicle hood lining according to claim 1, wherein at least one wall of said at least one elongate depression presents at least one orifice and two walls, said at least one orifice interrupts a line situated at an intersection between said two walls.

4. The vehicle hood lining according to claim 1, wherein at least one wall of said at least one elongate depression includes at least one projecting or recessed portion in relief, said at least one projecting or recessed portion in relief including at least one edge or reentrant corner, and having a shape of a crenellation.

5. The vehicle hood lining according to claim 4, wherein said at least one elongate depression includes at least two walls, and a line at an intersection between said at least two walls, said at least one projecting or recessed portion in relief being contiguous with said line.

6. The vehicle hood lining according to claim 1, wherein said first material is a plastics material selected from a thermosetting material and a thermoplastic material based on polypropylene or on polyamide and said second material is a metallic material, being at least one of aluminum or steel, a plastics material distinct from said first material, or a metal-plastics composite material.

7. The vehicle hood lining according to claim 1, wherein said at least one elongate depression extends essentially in a transverse direction along a rear edge of said vehicle hood lining.

8. A vehicle hood, comprising:
   a lining in accordance with claim 1; and
   a skin made of a metal material such as aluminum or steel or a metal/plastics hybrid material.

9. A method of fabricating a vehicle of a hood lining, wherein at least a portion of said hood lining is fabricated in such a manner as to present at least one elongate depression, preferably along an edge of said hood lining, and that said at least one elongate depression presents, at a distance from its ends, at least one singularity that is not reproduced both identically and in continuous manner along an entire length of said at least one elongate depression.

10. A vehicle hood comprising:
    a hood skin; and
    a lining adapted to receive and support said hood skin;
    said lining comprising a first wall, a second wall and an intermediate surface coupling said first wall and said second wall to define at least one elongate depression;
    at least one of said first wall or said second wall being discontinuous or interrupted to facilitate deformation of said lining;
    wherein said at least one singularity is a material singularity, said at least one elongate depression comprising at least a first portion made of a first material and defining at least one orifice, and a second portion made of a second material different from said first material and arranged in said at least one orifice so that said at least one orifice is filled with said second portion, said at least one elongate depression comprises a bottom wall having said at least one orifice with said second material arranged in said at least one orifice, at least a portion of said second material engaging said bottom wall.

11. The vehicle hood according to claim 10, wherein said at least one of said first wall or said second wall comprise at least one orifice.

12. The vehicle hood according to claim 10, wherein said at least one of said first wall or said second wall of said at least one elongate depression includes at least one projecting or recessed portion in relief, said at least one projecting or recessed portion in relief including in particular at least one edge or reentrant corner and preferably being in a shape of a crenellation.

13. The vehicle hood according to claim 12, wherein said at least one elongate depression includes at least two walls and a line at an intersection between said at least two walls, said at least one projecting or recessed portion in relief being contiguous with said line.

14. The vehicle hood according to claim 10, wherein at least one singularity is not reproduced identically and in a continuous manner along an entire length and is a material singularity, said at least one elongate depression comprising at least a first portion made of a first material and defining at least one orifice, and a second portion made of a second material different from said first material and arranged in said at least one orifice, preferably by having said first material overmolded thereon.

15. The vehicle hood according to claim 14, wherein said first material is a plastics material, in particular a material selected from a thermosetting material such as sheet molding compound and a thermoplastic material based on polypropylene or on polyamide, optionally reinforced with glass fibers, and/or said second material is selected from a metallic material, such as aluminum or steel, a plastics material distinct from said first material, and a metal-plastics composite material, optionally including carbon or magnesium.

16. The vehicle hood according to claim 10, wherein said at least one elongate depression extends essentially in a transverse direction along a rear edge of said vehicle hood.

17. The vehicle hood according to claim 6, wherein said first material includes glass fibers.

18. The vehicle hood according to claim 6, wherein said second material includes at least one of carbon or magnesium.

19. The vehicle hood according to claim 17, wherein said second material includes at least one of carbon or magnesium.

20. The vehicle hood according to claim 6, wherein said thermosetting material comprises a sheet molding compound.

\* \* \* \* \*